US011635118B2

(12) United States Patent
Sabeti et al.

(10) Patent No.: US 11,635,118 B2
(45) Date of Patent: Apr. 25, 2023

(54) ELECTRIC VEHICLE DRUM BRAKE DUST EVACUATION AND COOLING CONCEPT

(71) Applicant: Bendix Commercial Vehicle Systems LLC, Elyria, OH (US)

(72) Inventors: Manouchehr Sabeti, Avon, OH (US); Daniel E. Banks, Climax, MI (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 469 days.

(21) Appl. No.: 16/745,728

(22) Filed: Jan. 17, 2020

(65) Prior Publication Data

US 2021/0222747 A1 Jul. 22, 2021

(51) Int. Cl.
*F16D 65/827* (2006.01)
*F16D 51/00* (2006.01)
*F16D 65/02* (2006.01)

(52) U.S. Cl.
CPC ...... *F16D 65/827* (2013.01); *F16D 2051/005* (2013.01); *F16D 2051/006* (2013.01); *F16D 2065/1308* (2013.01)

(58) Field of Classification Search
CPC ..... B60K 7/0007; F16D 65/10; F16D 65/128; F16D 65/827; F16D 2051/005;
(Continued)

(56) References Cited

U.S. PATENT DOCUMENTS 2,687,192 A * 8/1954 Butterfield ............ F16D 65/827
301/37.39
2,973,843 A  3/1961 Layon
(Continued)

FOREIGN PATENT DOCUMENTS

CN  101312305 A  11/2008
CN  201779180 U  3/2011
(Continued)

OTHER PUBLICATIONS

Cover page of EP 3 083 307 A0 published Oct. 26, 2016 (one (1) page).
(Continued)

*Primary Examiner* — Thomas W Irvin
(74) *Attorney, Agent, or Firm* — Crowell & Moring LLP

(57) ABSTRACT

A drum brake assembly for use with a wheel end electric drive motor arrangement can generate brake dust, which may accumulate on the electric motor and cause heat retention problems that are detrimental to motor performance and longevity. These issues are addressed by providing an assembly including a support attachable to a vehicle axle element, brake shoes pivotally mountable on the support, and a wheel spindle interconnected with one end of the axle element. A wheel hub is rotatable around the spindle, and an electric motor unit is disposed between an end of the axle element and the spindle to produce rotation of the hub relative to the axle element. A brake drum is securable to the hub for rotation with the hub relative to the spindle by way of the electric motor unit. The brake drum includes a circumferential perimeter wall overlying the brake shoes, and a fan rotor is interconnected with that wall for rotation together with the drum and the wheel hub relative to the spindle. A perforated dust shield is attachable to the support on an axial side of the brake shoes opposite the fan rotor, such that, during vehicle operation, air drawn by blades on the fan rotor through openings in a wall of the brake drum carries debris out through perforations in the dust shield and away from the wheel end motor and brake assembly. A vehicle including the assembly mentioned and a process of ventilating that assembly are also discussed.

20 Claims, 8 Drawing Sheets

(58) Field of Classification Search
CPC ....... F16D 2051/006; F16D 2065/1308; F16D 2065/1328
USPC ..................................................... 188/264 R
See application file for complete search history.

(56) References Cited

U.S. PATENT DOCUMENTS

| | | | |
|---|---|---|---|
| 4,913,258 A * | 4/1990 | Sakurai ................. | B60K 17/30 180/242 |
| 4,989,697 A | 2/1991 | Denton | |
| 5,474,160 A * | 12/1995 | Siegrist ................... | F16D 65/10 188/264 R |
| 6,286,639 B1 | 9/2001 | Uhlig | |
| 6,371,259 B1 * | 4/2002 | Handa .................. | F16J 15/3264 188/18 R |
| 6,698,557 B2 | 3/2004 | Hayes et al. | |
| 8,459,386 B2 | 6/2013 | Pickholz | |
| 9,322,446 B2 * | 4/2016 | Plantan ................. | F16D 65/827 |
| 9,381,802 B2 | 7/2016 | Figuered et al. | |
| 9,841,094 B2 | 12/2017 | Monteiro De Lima | |
| 10,054,177 B2 | 8/2018 | Emmons | |
| 2002/0166311 A1 | 11/2002 | Maricq et al. | |
| 2003/0178270 A1 * | 9/2003 | Vollert .................... | F16D 65/10 188/264 R |
| 2010/0116573 A1 | 5/2010 | Kim | |
| 2010/0270093 A1 | 10/2010 | Sagara et al. | |
| 2011/0094807 A1 | 4/2011 | Pruitt et al. | |
| 2013/0098697 A1 | 4/2013 | Power et al. | |
| 2013/0218436 A1 | 8/2013 | Kirby | |
| 2014/0102838 A1 | 4/2014 | Plantan et al. | |
| 2014/0152076 A1 | 6/2014 | Vogler et al. | |
| 2014/0159468 A1 | 6/2014 | Heinen et al. | |
| 2015/0108823 A1 | 4/2015 | Figuered et al. | |
| 2016/0121709 A1 | 5/2016 | Shin | |
| 2017/0058975 A1 | 3/2017 | Szewczyk et al. | |
| 2018/0355934 A1 | 12/2018 | Emmons | |
| 2019/0128350 A1 | 5/2019 | Goodell | |
| 2019/0383340 A1 | 12/2019 | Seaman et al. | |
| 2020/0044514 A1 | 2/2020 | Banks et al. | |
| 2021/0260918 A1 * | 8/2021 | Sabeti ................. | B60B 27/0057 |

FOREIGN PATENT DOCUMENTS

| | | |
|---|---|---|
| CN | 102259556 A | 11/2011 |
| CN | 202130244 U | 2/2012 |
| CN | 202628898 U | 12/2012 |
| CN | 204121629 U | 1/2015 |
| CN | 103511513 B | 5/2016 |
| CN | 103362996 B | 9/2016 |
| CN | 106195063 A | 12/2016 |
| CN | 205991119 U | 3/2017 |
| CN | 107042754 A | 8/2017 |
| CN | 107965537 A | 4/2018 |
| CN | 207374108 U | 5/2018 |
| CN | 108730379 A | 11/2018 |
| CN | 109372915 A | 2/2019 |
| CN | 109681552 A | 4/2019 |
| CN | 208919155 U | 5/2019 |
| JP | 2007-155076 A | 6/2007 |
| JP | 2009-41749 A | 2/2009 |
| JP | 5534934 B2 | 7/2014 |
| KR | 1999-0031738 U | 7/1999 |
| KR | 10-2006-0073913 A | 6/2006 |
| KR | 10-2008-0036385 A | 4/2008 |
| KR | 10-2012-0022168 A | 3/2012 |
| KR | 10-2013-0119300 A | 10/2013 |
| KR | 10-1330694 B1 | 11/2013 |
| KR | 10-2014-0081397 A | 7/2014 |
| KR | 10-2014-0083811 A | 7/2014 |
| WO | WO 2009/086884 A1 | 7/2009 |
| WO | WO 2013/025096 A1 | 2/2013 |
| WO | WO 2015/092743 A2 | 6/2015 |

OTHER PUBLICATIONS

U.S. Appl. No. 16/051,628, filed Aug. 1, 2018.
International Search Report (PCT/ISA/210) issued in PCT Application No. PCT/US2021/019148 dated May 19, 2021 (three (3) pages).
Written Opinion (PCT/ISA/237) issued in PCT Application No. PCT/US2021/019148 dated May 19, 2021 (seven (7) pages).
International Search Report (PCT/ISA/220 and PCT/ISA/210) issued in PCT Application No. PCT/US2021/013647 dated Mar. 31, 2021 (three (3) pages).
Written Opinion (PCT/ISA/237) issued in PCT Application No. PCT/US2021/013647 dated Mar. 31, 2021 (nine (9) pages).
International Preliminary Report on Patentability (PCT/IB/326 & PCT/IB/373) issued in PCT Application No. PCT/US2021/019148 dated Sep. 9, 2022, including Written Opinion (PCT/ISA/237) issued in PCT Application No. PCT/US2021/19148 (nine (9) pages).
International Preliminary Report on Patentability (PCT/IB/326 & PCT/IB/373) issued in PCT Application No. PCT/US2021/013647 dated Jul. 28, 2022, including document C4 (Written Opinion (PCT/ISA/237)), filed on Jun. 9, 2021 (11 pages).
United States Notice of Allowance issued in U.S. Appl. No. 16/799,331 dated Jan. 9, 2023 (19 pages).

* cited by examiner

ELECTRIC VEHICLE DRUM BRAKE DUST EVACUATION AND COOLING CONCEPT

CROSS REFERENCE TO RELATED APPLICATION

Cross reference is hereby made to a commonly assigned U.S. patent application, titled SPLINED DRUM AND ELECTRIC MOTOR ENGAGEMENT ASSEMBLY (Ser. No. 16/799,311), identifying as inventors the same individuals as the present case.

BACKGROUND OF THE INVENTION

1. Field of the Invention

This invention concerns an arrangement addressing brake dust generation issues arising in a drum brake assembly for use with a wheel end electric drive motor arrangement of a commercial vehicle.

2. Description of Related Art

Chinese Publications CN 208919155 U, CN 106195063 A, and CN 101312305 A, Korean Publication 10-2006-007913, and Japanese Publication JP 5534934 B2 all concern heat dissipation or cooling features in brake arrangements. Other non-U.S. publications that may be of interest are Chinese Publications CN 205991119 U, CN 103511513 B, CN 109681552 A, CN 109372915 A, CN 108730379 A, CN 107965537 A, CN 204121629 U, CN 103362996 B, CN 202628898 U, CN 202130244 U, CN 102259556 A, and CN 201779180 U, Korean Publications 1999-0031738, 10-2013-0119300, and 10-2008-0036385, and Japanese Publication 2009-41749. U.S. Patent Application Publications US 2014/0102838 A1 to Plantan et al. and US 2019/0128350 A1 to Goodell, and U.S. Pat. No. 2,973,843 to Lyon, U.S. Pat. No. 4,989,697 to Denton, and U.S. Pat. No. 6,698,557 B2 to Hayes et al., may all be of interest as well.

SUMMARY OF THE INVENTION

A drum brake assembly for use with a wheel end electric drive motor arrangement of a commercial vehicle drive train can generate a substantial amount of brake dust, which may be trapped within the wheel end motor and brake assembly when a standard dust shield is used. The brake dust can accumulate on the electric motor and cause problems with heat retention in the motor, which can be detrimental to motor performance and longevity. The present invention addresses these issues.

In one particular embodiment of the invention, a wheel end motor and brake assembly for a vehicle includes a support securely attachable to a vehicle axle element. Brake shoes are pivotally mountable on the support, and a wheel spindle is interconnected with one end of the axle element. A wheel hub is rotatable around the spindle, and an electric motor unit is disposed between the one end of the axle element and the spindle to produce rotation of the hub relative to the axle element. A brake drum is securable to the hub for rotation together with the hub relative to the spindle by way of the electric motor unit. The brake drum includes a circumferential perimeter wall overlying the brake shoes, and a fan rotor is interconnected with the circumferential perimeter wall of the brake drum for rotation together with the drum and the wheel hub relative to the spindle. A perforated dust shield is attachable to the support on an axial side of the brake shoes opposite the fan rotor, such that, during vehicle operation, air drawn by blades on the fan rotor through openings in a wall of the brake drum carries debris out through perforations in the dust shield and away from the wheel end motor and brake assembly.

Preferably, the fan rotor is interconnected with the circumferential perimeter wall by keys received in slots, with the keys being distributed around an inner surface of the circumferential perimeter wall of the brake drum. The fan rotor advantageously includes a substantially U-shaped web portion interconnected by the keys with the circumferential perimeter wall of the brake drum. Blades on the fan rotor are provided on an impeller detachably secured to the fan rotor, and the dust shield is perforated, in one preferred embodiment, by way of dust shield slots extending radially with respect to the dust shield. For improved strength, the brake drum may include a rib on the circumferential perimeter wall, with the rib extending around an end of the drum opposite a mounting flange on the drum used to attach the drum and the wheel hub together. Interlocking slots are also preferably distributed around an outer circumference of a rim located at one axial end of the fan rotor. The internal fan, the perforated dust shield, and slotted drum features of the wheel end assembly according to the invention serve to improve cooling of the electric drive motor and improve evacuation of contaminants that can build up on the motor and cause heat build-up, further improving cooling. The present invention further concerns a vehicle including the wheel end motor and brake assembly mentioned, as well as a process of ventilating that wheel end motor and brake assembly.

DESCRIPTION OF THE PREFERRED EMBODIMENTS

Figure 1:
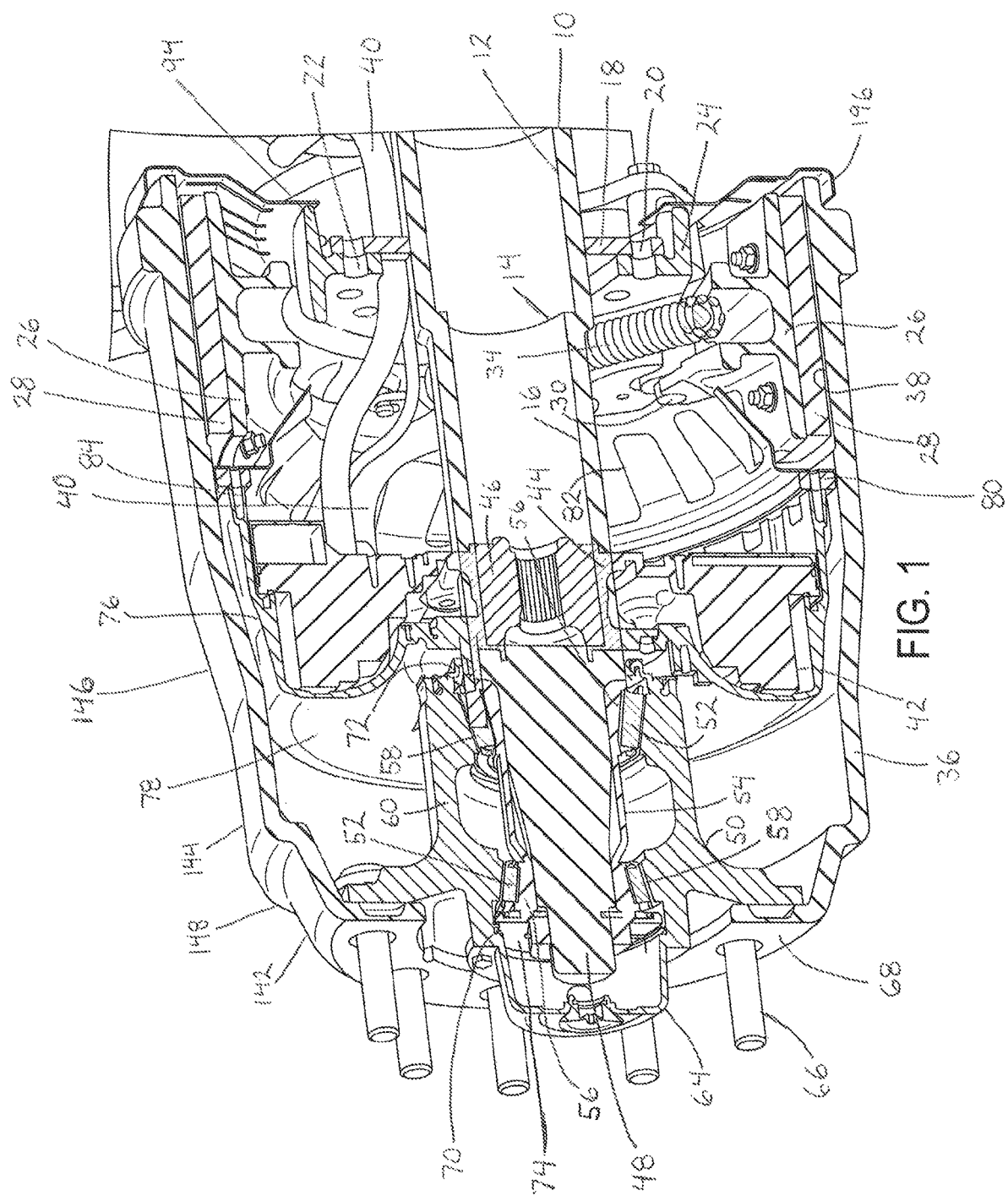
FIG. 1 is a view, partly in section, of an outboard end of an end-of-axle arrangement incorporating drum brake dust evacuation features according to the present invention.

The wheel end motor and brake assembly illustrated in FIG. 1 includes an axle tube 10 having an inboard section 12 interconnected at a step 14 to a reduced diameter outboard section 16. An attachment flange 18 is shown as welded or otherwise secured to the inboard axle tube section 12. By way of bolts (not illustrated) passing through aligned holes 20 and 22, a support, here formed by a drum brake support plate 24, is securely attached to the flange 18 and the axle tube 10. A pair of drum brake shoes 26 having linings 28 are pivotally secured by way of a post, or a pair of posts (not shown) to the support plate 24 in typical fashion. Upon operation of an actuator 32 (indicated in FIG. 3), a cam 33 is rotated in the conventional way, causing rollers 30 to displace adjacent ends of the shoes 26 away from one another against the action of a return spring 34. The shoes 26 thus pivot around the post or posts mentioned, and force the linings 28 into contact with an inner circumferential friction surface 38 of a brake drum 36, described below. Attachment of the return spring to the brake shoes 26 is best visible in FIG. 3.

Suitable cables 40, passing through openings in the flange 18 and/or the support plate 24, permit communication of relevant vehicle controls (not shown) and a vehicle battery (not shown) with a schematically represented electric motor rotor, stator, and power electronics unit 42. By way of a sleeve 44 press fit, keyed to, or otherwise affixed to the outboard axle tube section 16, the stator and power electronics portions of the unit 42 are rigidly secured to the outboard section 16 of the axle tube 10. A splined fitting 46 is received within the sleeve 44, such that both the sleeve 44 and the splined fitting 46 are disposed axially with respect to the tube 10 between the reduced diameter outboard axle section 16 and an outer wheel spindle 48.

A wheel hub 50 is mounted by way of bearings 52 for rotation relative to the spindle 48. Inner bearing races 56 are defined on the exterior of a tubular bearing race insert 54 received over, extending around, and secured in any suitable manner to the spindle 48. Outer bearing races 58 respectively corresponding to the inner bearing races 56 mentioned are defined by suitably formed or machined surfaces on the wheel hub 50. The wheel hub 50 shown is a unitary cast or machined element including a hollow stem 60, a protective cap 64, and a flange, extending at least partly around the wheel hub 50 and located between the stem 60 and the cap 64. Threaded bolts 66, passing through aligned holes in the wheel hub flange and a mounting flange 68 at the outboard end of the brake drum 36, are used, along with nuts received on the bolts 66, to secure the brake drum 36 and the wheel hub 50 together. A schematically illustrated split ring 70, receivable in a groove (not shown) circumferentially formed in the interior surface of the cap 64 of the wheel hub, can engage a dust blocking annular wall 74 formed on the insert 54 to retain the insert in proper axial position relative to the wheel hub 50 and the spindle 48. A dust seal 72 is also provided between the axially interior end of the stem 60 and the spindle 48. The seal 72 and the annular wall 74 serve to minimize effects of road debris and dust generated during vehicle braking on the bearings 52.

Figure 4:
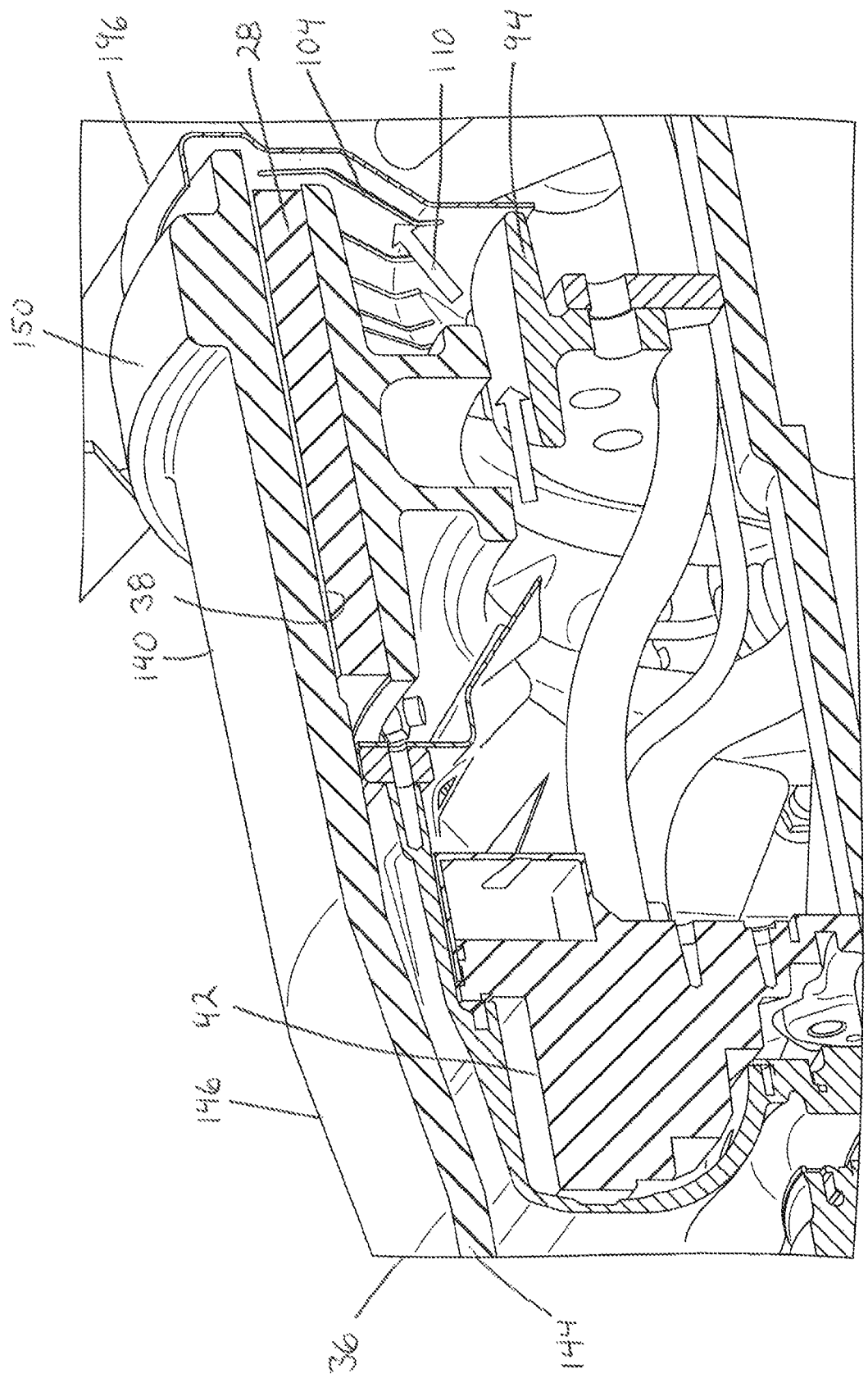
FIG. 4 is an enlarged view of a portion of FIG. 1, illustrating air flow produced according to the invention.
Figure 5:
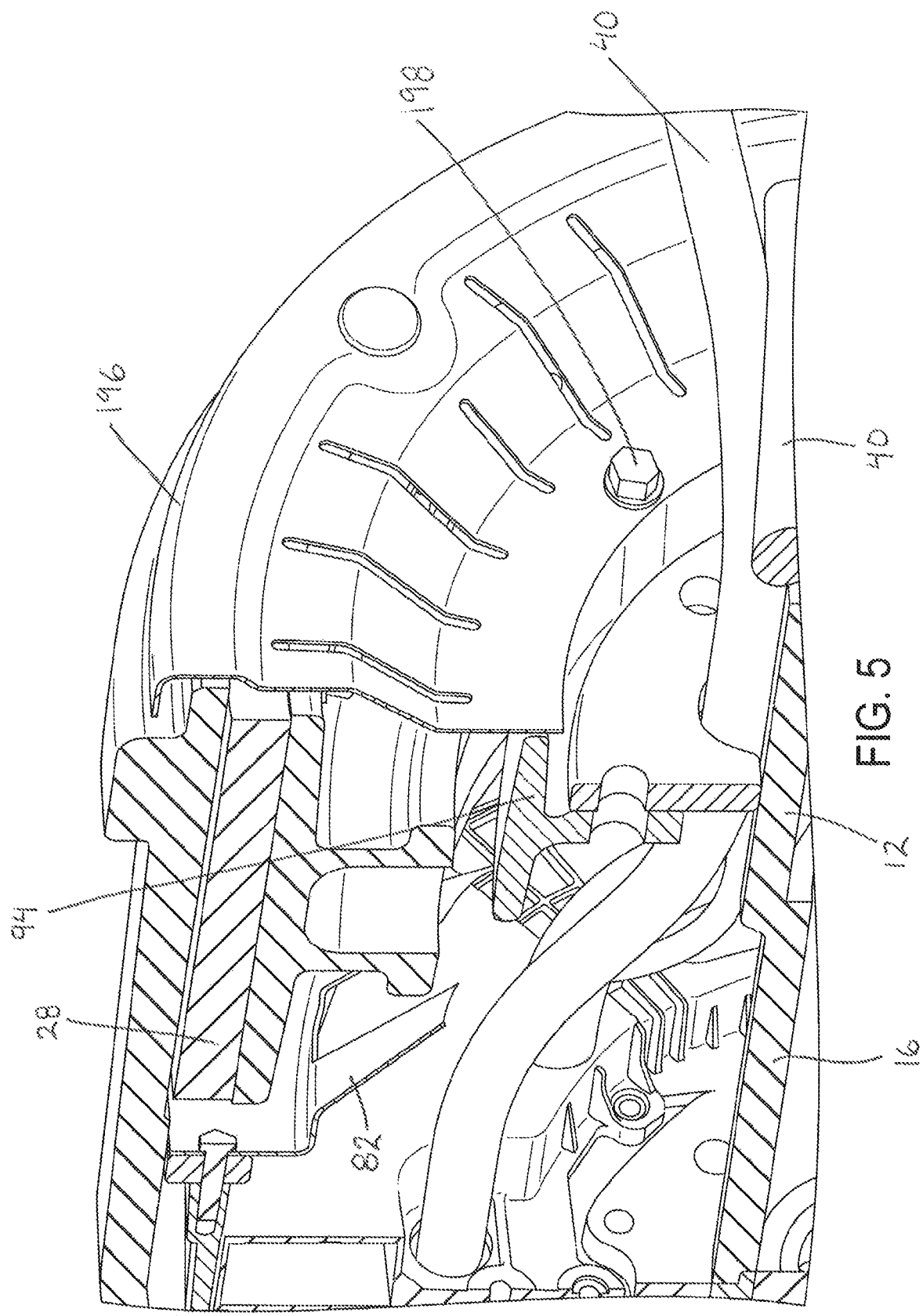
FIG. 5 is an enlarged view of a portion of FIG. 2.
Figure 6:
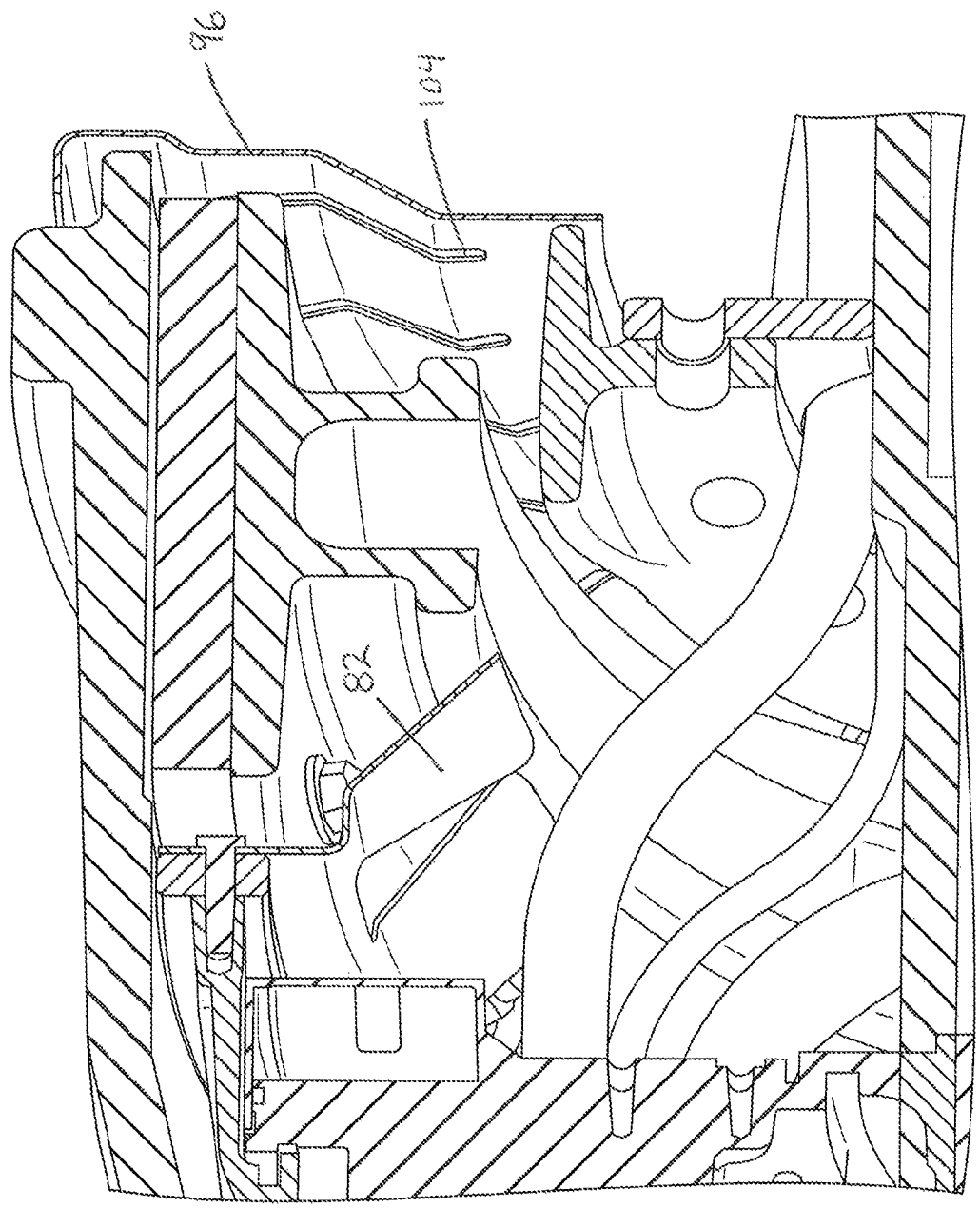
FIG. 6 is a view showing relative positions, during use, of a fan impeller and a dust shield according to the invention.

FIGS. 4-6 provide enlarged views of an inboard portion of the brake drum 36. The drum 36 includes a large diameter inboard section 140, a small diameter outboard section 142 (indicated in FIG. 1), an intermediate section 144 between the inboard and outboard rotor sections 140 and 142, as well as tapered transition sections 146 and 148 respectively located between the inboard and intermediate rotor sections 140 and 144 and the outboard and intermediate rotor sections 142 and 144. A portion of the interior wall surface of the large diameter inboard section 140 forms the friction surface 38 engaged during braking by the brake linings 28. The inboard rotor section 140 is shown as having a circumferentially extending reinforcing rib or bulge 150 extending around an end of the drum opposite the mounting flange 68. The rib or bulge 150 provides added strength to the drum 36, which might be required, as the elongated configuration of the drum 36 could possibly compromise torsional rotor rigidity.

A fan rotor 76 includes a substantially U-shaped web portion 78 configured to partially enclose the unit 42 of the electric motor. In contrast to the arrangement forming the subject matter of CN 106195063 A identified above, for example, in the present invention, the web portion 78 is secured in a particular manner to be described to the brake drum 36 so that the fan rotor 76 rotates relative to the sleeve 44 together with the drum. A suitable bearing/seal arrangement (not indicated) may be mounted between the web portion 78 and the sleeve 44 to enable relative rotation but limit passage of any contaminants. In addition to partially enclosing the unit 42 of the electric motor, the fan rotor web portion 78 extends axially with respect to the tube 10 inboard beyond the unit 42, for attachment to (or actually defining) an enlarged mounting rim 80 extending circumferentially around the inboard axial end of the web portion 78.

Figure 3:
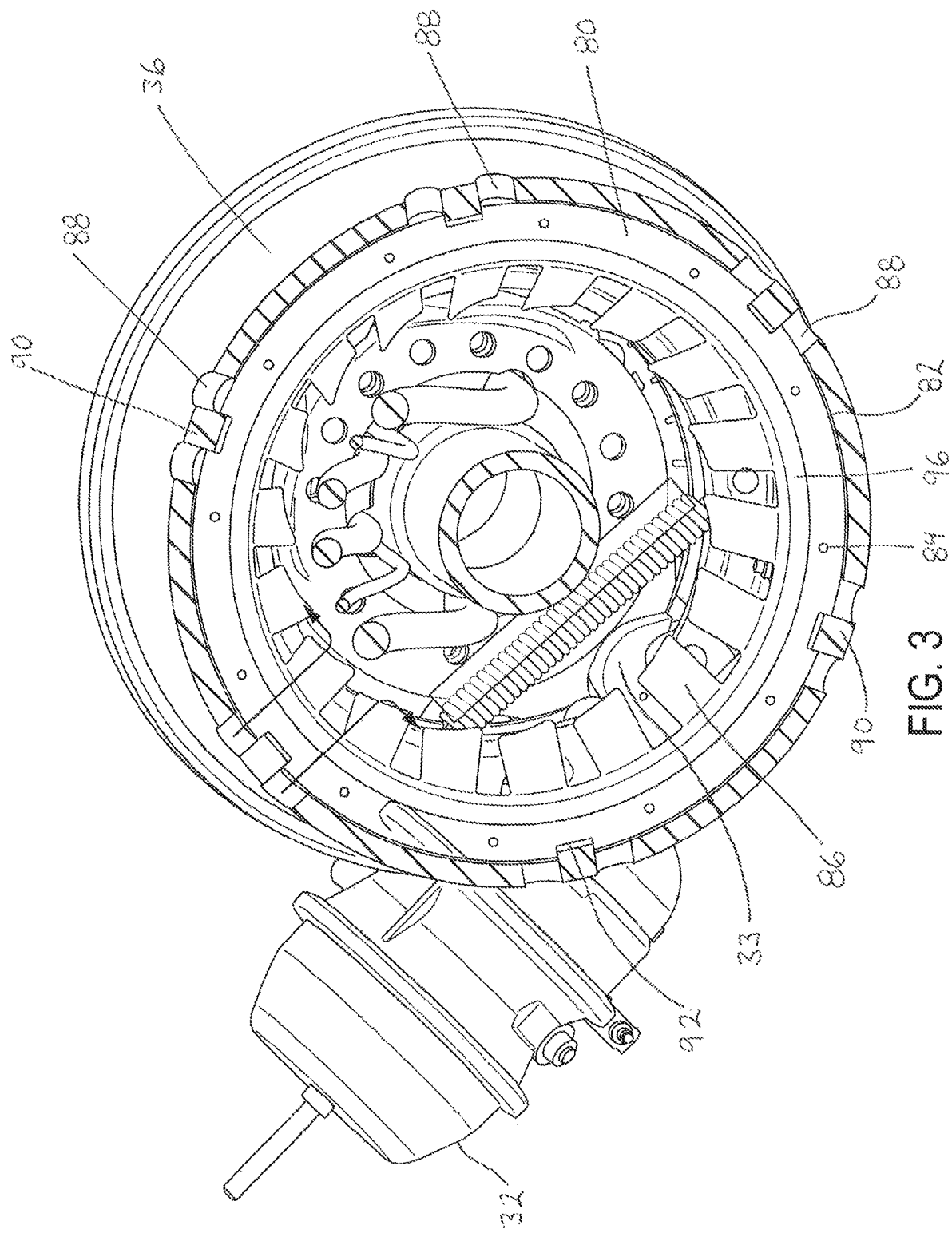
FIG. 3 is a view of various elements of the invention, including a fan impeller attachable to the mounting rim of a brake drum.

As shown in FIG. 3, a fan impeller 82 is attachable to the mounting rim 80 by screws or other fasteners received in bores 84. The impeller 82 includes a circular base or frame 96 with multiple circumferentially distributed blades 86 projecting axially and extending radially inwardly from the base or frame 96. During vehicle operation, as the fan impeller 82 rotates together with the web portion 78, air is drawn through openings, here formed by key slots 88 as shown in FIG. 3, provided in the circumferential perimeter wall of the brake drum 36. Air drawn through the key slots 88 entrains dust generated during braking and in this way acts to evacuate that dust from the overall arrangement illustrated in FIG. 1 in a way to be described. The key slots 88 are located in pairs on opposite sides of keys 90 distributed around the inner circumferential wall surface of the brake drum 36. These keys 90 project radially relative to the brake drum and are received in corresponding radial recesses or slots 92 provided in the enlarged inboard mounting rim 80 of the web portion 78 to constrain the brake drum 36 with the fan impeller 82 affixed to the rim 80 for joint rotation together.

Figure 2:
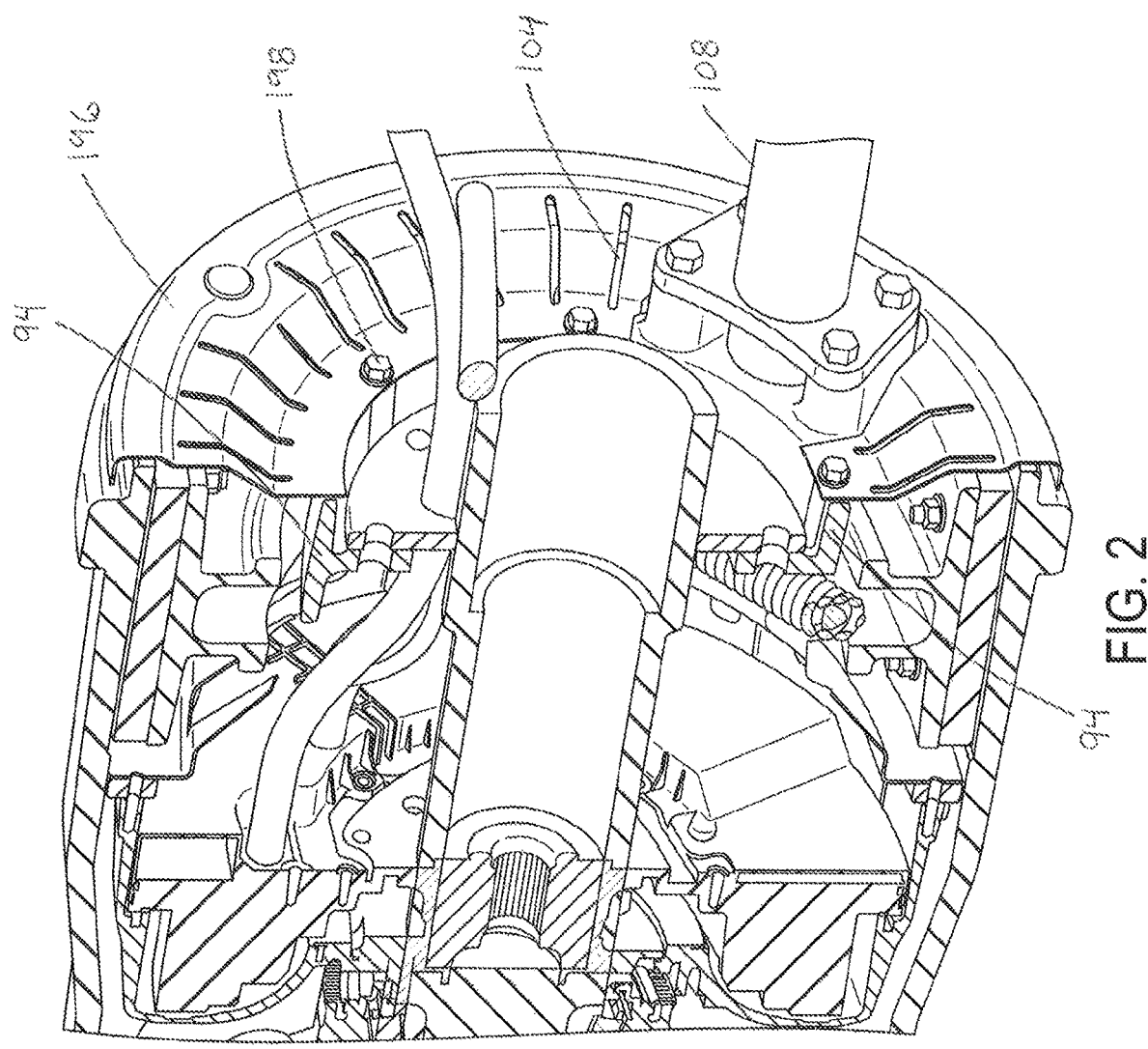
FIG. 2 is a view, partly in section, of an inboard end of the end-of-axle arrangement shown in FIG. 1.
Figure 7:
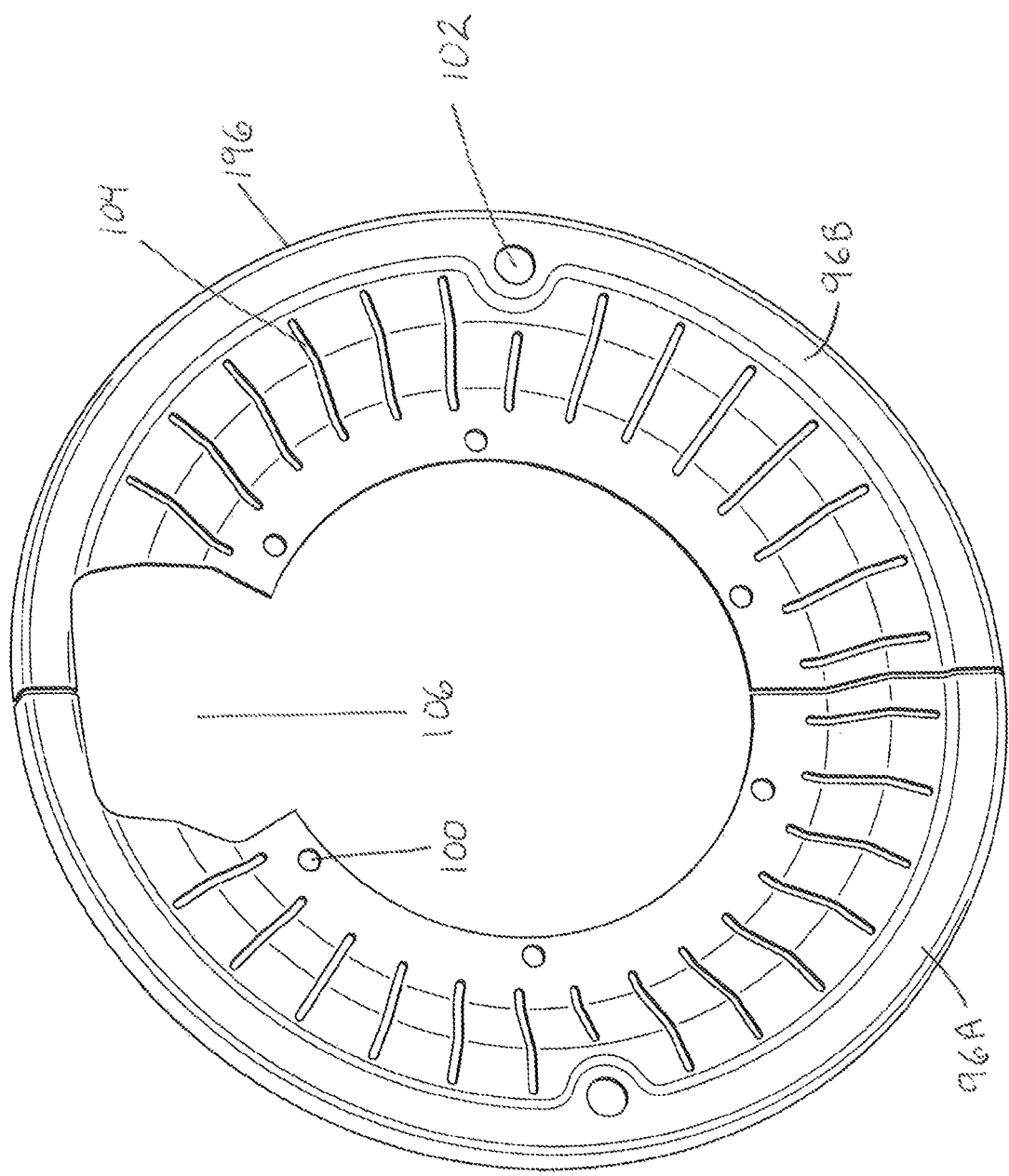
FIG. 7 is a view of the complete dust shield that is partly shown in FIG. 6.

Referring now to FIGS. 2, 5, and 7, the drum brake support plate 24 defines an axially extending projection 94. A slotted or otherwise perforated dust shield 196 is securely attached by way of bolts 198 extending through mounting holes 100 into the projection 94. Additional mounting holes 102 (FIG. 7) may be provided in the dust shield 196 at locations displaced from the mounting holes 100. These additional mounting holes permit attachment of the dust shield 196 to other vehicle structure for a more secure connection. During vehicle operation, dust generated while braking is entrained by air drawn by way of the impeller 82 into the arrangement shown in FIGS. 1 and 3 through the key slots 88. The air and dust are then exhausted from the overall drum brake arrangement, in the direction of arrows 110 shown in FIG. 4, through the slots or other perforations 104 in the dust shield 196. FIG. 7 shows the dust shield 196 as formed from two parts, 196A and 196B, facilitating assembly, although the dust shield could be formed from three or more parts, or as a single monolithic unit, depending on manufacturing and assembly requirements. FIG. 7 also shows the dust shield with a clearance or void 106 permitting passage of a cam shaft 108, indicated in FIG. 2, operated by the actuator 32 (FIG. 3) mentioned previously to displace the rollers 30 at adjacent ends of the shoes 26 away from one another against the action of the return spring 34. Each of the parts 196A and 196B shown in FIG. 7 includes fourteen radially extending slots 104, although openings having shapes other than slots, and more or fewer openings than the fourteen shown in FIG. 7, could be used.

Relative positions, during use, of the fan impeller 82 and the dust shield 196 with the slots 104 or other openings are evident in the illustrations supplied by FIG. 4, FIG. 5, and FIG. 6.

Figure 8:
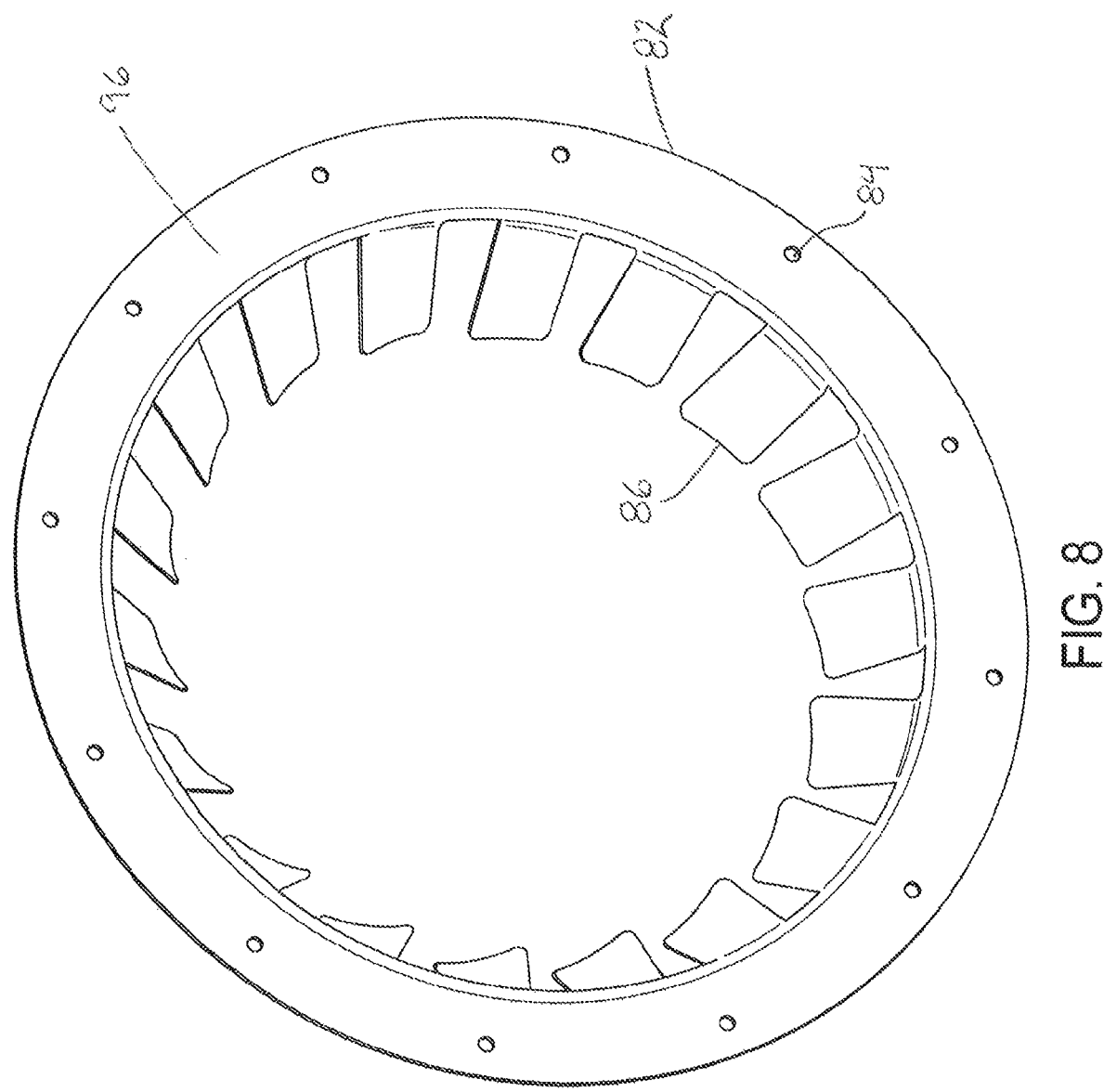
FIG. 8 is a view of the complete fan impeller that is partly shown in FIG. 6

FIG. 8 is a view in perspective of the overall fan impeller 82 by itself. The impeller illustrated has a one piece structure including the circular base or frame 96 mentioned above, with the multiple circumferentially distributed blades 86 referred to above projecting axially and extending radially inwardly from the base or frame 96. Depending on manufacturing requirements and operating temperatures, the impeller may be constructed of aluminum or an aluminum alloy, other metal or metal alloy types, plastic, and so on. The impeller may be stamped, cast, machined, or otherwise put into the appropriate configuration. Although the impeller illustrated has a one piece structure as noted, the impeller could alternatively be formed of multiple parts. FIG. 8 shows the impeller 82 and having eighteen blades 86, but any suitable number of impeller blades could be used. The impeller base or frame 96 shown also has twelve bores 84 to receive screws or other fasteners for securing the impeller to the enlarged mounting rim 80 extending circumferentially around the inboard end of the web portion 78, but, again, any suitable number of bores and corresponding screws or fasteners could be utilized.

It will be understood from the description supplied that the present invention generally concerns a drum brake assembly for a wheel end electric drive motor arrangement used in a commercial vehicle drivetrain. The arrangement includes an internal fan component, formed in the disclosed embodiment by the impeller 82 attached either to the electric motor rotor or to the brake drum. The impeller 82 develops air flow through the brake assembly, when relevant brake assembly components are rotating, to introduce cooling air and force brake dust contaminants out of the wheel end motor and brake assembly. The contaminants are forced away from the wheel end motor and brake assembly components through openings in a modified dust shield, while fresh air is drawn into the drum brake assembly through multiple slotted openings in the circumferential area of the drum 36.

The foregoing disclosure has been set forth merely to illustrate the invention and is not intended to be limiting. Since modifications of the disclosed embodiments incorporating the spirit and scope of the invention may occur to persons skilled in the art, the invention should be construed to include everything within the scope of the appended claims and equivalents thereof.

The invention claimed is:

1. A wheel end motor and brake assembly for a vehicle comprising:
   a support securely attachable to a vehicle axle element and having a pair of brake shoes pivotally mountable thereon,
   a wheel spindle interconnected with one end of the axle element,
   a wheel hub rotatable around the spindle,
   an electric motor unit disposed between the one end of the axle element and the spindle to produce rotation of the hub relative to the axle element,
   a brake drum securable to the hub for rotation together with the hub relative to the spindle by way of the electric motor unit, the brake drum including a circumferential perimeter wall overlying the brake shoes,
   a fan rotor interconnected with the circumferential perimeter wall of the brake drum for rotation together with the drum and the wheel hub relative to the spindle, and
   a perforated dust shield attachable to the support on an axial side of the brake shoes opposite the fan rotor, wherein,
   during vehicle operation, air drawn by blades on the fan rotor through openings in the wall of the brake drum carries debris out through perforations in the dust shield and away from the wheel end motor and brake assembly, and
   the fan rotor is interconnected with the circumferential perimeter wall by keys received in slots.

2. The assembly of claim 1, wherein the dust shield forms a void permitting passage of brake actuator structure therethrough.

3. The assembly of claim 1, wherein the keys are distributed around an inner surface of the circumferential perimeter wall of the brake drum.

4. The assembly of claim 3, wherein the fan rotor includes a substantially U-shaped web portion interconnected by the keys with the circumferential perimeter wall of the brake drum.

5. The assembly of claim 1, wherein the blades on the fan rotor are provided on a fan impeller detachably secured to the fan rotor.

6. The assembly of claim 1, wherein the dust shield is perforated by way of slots extending radially with respect to the dust shield.

7. The assembly of claim 1, wherein the brake drum includes a rib on the circumferential perimeter wall, the rib extending around an end of the drum opposite a mounting flange on the drum used to attach the drum and the wheel hub together.

8. The assembly of claim 1, wherein the slots are distributed around an outer circumference of a rim located at one axial end of the fan rotor.

9. A vehicle including a wheel end motor and brake assembly, the assembly comprising:
   a support securely attachable to a vehicle axle element and having a pair of brake shoes pivotally mountable thereon,
   a wheel spindle interconnected with one end of the axle element,
   a wheel hub rotatable around the spindle,
   an electric motor unit disposed between the one end of the axle element and the spindle to produce rotation of the hub relative to the axle element,
   a brake drum securable to the hub for rotation together with the hub relative to the spindle by way of the electric motor unit, the brake drum including a circumferential perimeter wall overlying the brake shoes,
   a fan rotor interconnected with the circumferential perimeter wall of the brake drum for rotation together with the drum and the wheel hub relative to the spindle, and
   a perforated dust shield attachable to the support on an axial side of the brake shoes opposite the fan rotor, wherein,
   during vehicle operation, air drawn by blades on the fan rotor through openings in a wall of the brake drum carries debris out through perforations in the dust shield and away from the wheel end motor and brake assembly of the vehicle, and
   the fan rotor is interconnected with the circumferential perimeter wall by keys received in slots.

10. The vehicle according to claim 9, wherein the dust shield forms a void permitting passage of brake actuator structure therethrough.

11. The vehicle of claim 10, wherein the blades on the fan rotor are provided on a fan impeller detachably secured to the fan rotor.

12. The vehicle of claim 10, wherein the dust shield is perforated by way of slots extending radially with respect to the dust shield.

13. The vehicle of claim 10, wherein the brake drum includes a rib on the circumferential perimeter wall, the rib extending around an end of the drum opposite a mounting flange on the drum used to attach the drum and the wheel hub together.

14. The vehicle of claim 9, wherein the keys are distributed around an inner surface of the circumferential perimeter wall of the brake drum.

15. The vehicle of claim 14, wherein the fan rotor includes a substantially U-shaped web portion interconnected by the keys with the circumferential perimeter wall of the brake drum.

16. The vehicle of claim 9, wherein the slots are distributed around an outer circumference of a rim located at one axial end of the fan rotor.

17. A process of ventilating a wheel end motor and brake assembly for a vehicle, comprising:

providing a support securely attachable to a vehicle axle element and a pair of brake shoes pivotally mountable thereon, a wheel spindle interconnected with one end of the axle element, a wheel hub rotatable around the spindle, an electric motor unit disposed between the one end of the axle element and the spindle to produce rotation of the hub relative to the axle element, and a brake drum securable to the hub for rotation together with the hub relative to the spindle by way of the electric motor unit, the brake drum including a circumferential perimeter wall overlying the brake shoes, interconnecting a fan rotor with the circumferential perimeter wall of the brake drum for rotation together with the drum and the wheel hub relative to the spindle, attaching a perforated dust shield to the support on an axial side of the brake shoes opposite the fan rotor, and introducing air into the assembly through openings in the wall of the brake drum with blades on the fan rotor during vehicle operation, thereby carrying debris away from the wheel end motor and brake assembly through perforations in the dust shield with the air, wherein the fan rotor is interconnected with the circumferential perimeter wall by keys received in slots.

18. The process of claim 17, wherein the dust shield forms a void permitting passage of brake actuator structure therethrough.

19. The process of claim 17, wherein the keys are distributed around an inner surface of the circumferential perimeter wall of the brake drum.

20. The process of claim 19, wherein the fan rotor includes a substantially U-shaped web portion interconnected by the keys with the circumferential perimeter wall of the brake drum.

* * * * *